United States Patent Office 3,192,660
Patented July 6, 1965

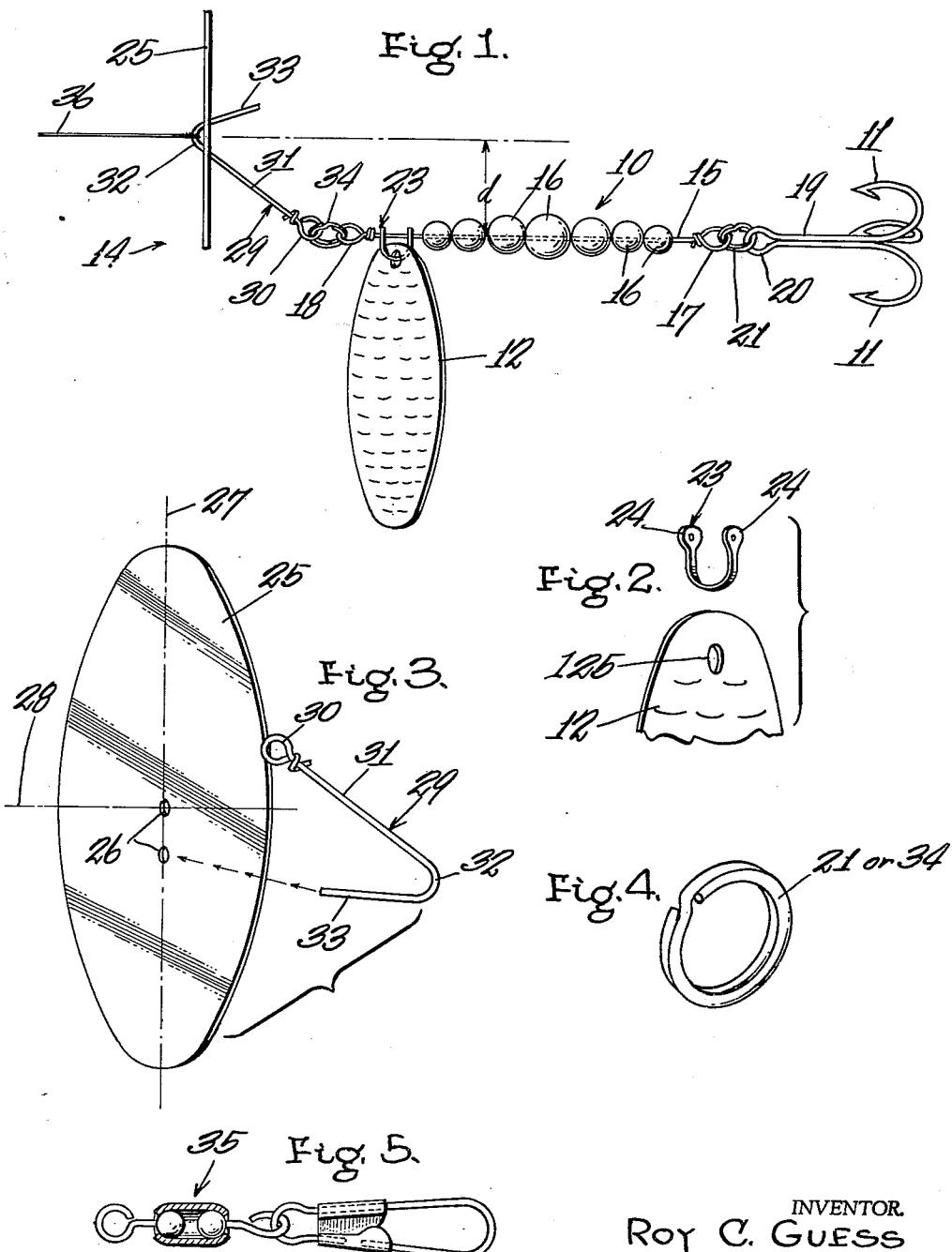

3,192,660
SPINNER STABILIZER
Roy C. Guess, Fairgrounds Blvd., R.D. 2, Canfield, Ohio
Filed Nov. 19, 1963, Ser. No. 324,666
5 Claims. (Cl. 43—42.16)

My invention relates to fishing lures, particularly to lures such as may be used in casting, trolling and the like, and the principal object of my invention is to provide new and improved lures of this character.

My invention is particularly useful in connection with the so-called spinning type lure wherein a light reflecting blade is rotatably connected to the body portion of the lure, and revolves around the axis of such body portion as the lure is retrieved. This type of lure has had considerable demand because of its success in attracting fish, but it also has had a serious disadvantage in that the revolving action had a tendency to twist the line longitudinally and effect an early failure of such line, as well as to encourage line action which results in snarls, knots and the like.

My invention also provides an easy and economical lure assembly. The foregoing, and other advantages will be ascertainable from a study of the following description and the appended drawing in which, FIGURE 1 is a side elevation of a fishing lure disclosing an embodiment of my invention, FIGURE 2 is an enlarged separated perspective view of parts included in the embodiment of FIGURE 1, FIGURE 3 is an enlarged separated perspective view of other parts included in the embodiment, FIGURE 4 is an enlarged perspective view of a spiral split ring used in said embodiment, and FIGURE 5 is an enlarged fragmentary plan view, partly in section, illustrating another type of connection.

Referring to the drawing, the embodiment of my invention disclosed in FIGURE 1 comprises an elongated body 10 having a fish hook 11, or cluster of fish hooks as herein shown, attached at one end. A spinner blade 12 is rotatably mounted on the body for revolution about the longitudinal axis of the latter. Means 14 are connected to the body 10 and are so constructed and arranged to resist such rotation of the body as might be caused by revolution of the blade 12.

In a preferred embodiment, the body 10 comprises a length of substantially straight relatively stiff wire 15 having a plurality of brass beads 16 loosely strung thereon to act as weights. The beads may be made of material other than brass, and further, instead of beads a single elongated weight member may be connected to or strung on the wire. The wire has loops 17 and 18 formed on its opposite ends in customary manner.

The cluster of fish hooks is connected to a common shank 19 which is formed with a loop 20. A split ring 21 of the spiral type, as best shown in FIGURE 4, may be used to connect the loops 17 and 20, the ring providing ready connection and disconnection between the shank 19 and the body 10, thus enabling a user to assemble different types or sizes of hooks with a common body.

The beads 16, or other types of weight, do not completely occupy the entire length of the wire 15 between the loops 17 and 18 so that such beads may shift longitudinally along the wire. Sufficient space is left along the wire so that the spinner blade 12 may be connected to the wire. The blade 12 is preferably flat and elliptical in shape, as shown, although it may have any other suitable shape. The blade may be made of stainless steel, brass or other similar material to resist corrosion and to provide a light reflecting surface, and it may have fish scale indications thereon.

One manner of securing the blade 12 to the wire is herein shown, and comprises a clevis connection 23 which is formed as a U-shaped metal strap having apertured eyes 24, 24 through which the wire 15 is passed, preferably before the lip 18 is formed. The blade 12 has a hole 125 at one of its lengthwise ends to freely pass one of the eyes 24 and to receive the bight portion of the U-shaped clevis 23.

As the lure is drawn through the water, as by a retrieving action, or when the lure is held stationary in a swiftly flowing stream, action of the water against the spinner blade 12 causes the latter to revolve around the wire 15. Since the blade is light reflecting, its action attracts the attention of any fish in the vicinity of the lure.

However, spinning action of the blade 12 causes a turning movement to be applied to the fishing line. For example, water pressure against the spinning blade would cause the clevis eye adjoining the beads to bear against the latter and further force the beads against the loop 17 so that a frictional coupling would be made with the wire 15. Thus, spinning action of the blade 12 would cause the line to twist about its longitudinal axis and therefore result not only in a reduction in line life, but also would encourage loops, knots and other undesirable characteristics in the line.

My invention has eliminated the undesirable twisting of the line without sacrificing the desirable spinning action of the blade 12. As herein disclosed, I have added a stabilizer blade 25 which is constructed and arranged to resist any twisting action of the line which may be induced by the spinning action of the blade 12.

In the presently disclosed embodiment, the stabilizer blade is generally flat and elliptical in shape, as shown, although it may have any other suitable shape. If desired, this blade may also have a light reflecting surface and may be made of stainless steel or brass to not only reflect light but also resist corrosion. The blade 25 is provided with a pair of holes 26—26 extending therethrough, both holes preferably being located on the major axis 27 of the blade, with the upper hole (FIGURE 3) preferably at the intersection of the major axis with the minor axis 28 and the other hole located below the upper hole. This provides an unbalanced condition, the purpose of which will be explained later.

Connecting the stabilizer blade 25 to the body 10 is a wire connector 29 which has one end formed with a loop 30. Extending from the loop 30 is one leg 31 which leads to a bight portion 32, and extending from the latter is the free end or leg 33 of the wire connector. To assemble the wire connector to the blade 25, it is merely necessary to hook the free leg 33 through one of the blade holes 26 (the lower one in FIGURE 3) and thread the blade over the bight 32 so that the leg 31 extends through the lower hole. The free leg 33 is then extended through the upper hole 26. The wire connector is preferably made of wire that has some resilience, and therefore the legs 31, 33 may have to be pressed toward each other at the time the free leg is inserted through the lower hole 26, but when this free leg is inserted, it will spring back so that the wire connector is firmly held to the blade 25. In the event the wire connector has little resilience, it may be necessary to bend the legs together, and later apart to effect the assembly. The legs 31, 33 when spread apart engage the margins of the holes 26, 26 fairly snugly in a vertical direction, but have a fairly loose fit with the holes in a horizontal direction so that the plate 25 may wobble or flutter about the vertical axis 27.

A spiral split ring 34 may be connected between the loops 18 and 30 so that the stabilizer plate 25 may be easily connected to or disassembled from the body 10. In some cases, the spiral split rings 21 and 34 may be omitted. In such case, the loop 17 would be connected directly to the loop 20, and the loop 18 would be connected directly to the loop 30. Further, instead of the split ring 34, a snap and swivel 35 of conventional design as shown in FIGURE 5 may be utilized.

A fish line 36 may be tied to the bight 32 of the wire connector. The lure may be cast into the water in any desired manner and in absence of any retrieving force the lure simply hangs from the line, as may be visualized by rotating FIGURE 1 through ninety degrees with the line 36 uppermost. When a retrieving force is applied to the line, the stabilizer blade 25 will be moved toward an upright position by water passing by the blade. The greater the force of retrieve, the greater will be the force tending to move the blade 25 upright, and the blade may be moved to a vertical position as shown in FIGURE 1, or even beyond such position, with its greater portion up.

Since the legs 31, 33 of the connector wire 29 have a fairly snug fit with the vertical margins of the holes 26, 26, upright movement of the stabilizer blade will cause the leg 31 to incline downwardly, as seen in FIGURE 1, with the body 10 stringing along therefrom in a generally horizontal position. This causes the axis of the body to be displaced downwardly from the axis of the line 36, as shown by the dimension "d," and it is this offset that assists in preventing rotation of the body 10 about the axis of the line 36. Thus, the greater the force of retrieve, the greater will be the force tending to move the stabilizer blade 25 to upright position and consequently the greater will be the offset "d" and thus the greater will be the resistance to turning about the axis of the line 36, even though the increase in retrieving force will increase the spinning action of the blade 12.

Therefore, the spinner blade, by reason of the water action thereagainst, will revolve rapidly around the axis of the body wire 15 to reflect light (assuming suitable light is present) to attract the fish in the vicinity of the lure. The stabilizer plate 25, by reason of the fact that it is connected off-center and with its greater area upward, and further by reason of the off-center relation of the body 10 with respect to the axis of the line 36, as induced by upright position of the blade 25, will resist rotational forces induced by the rotating spinning blade and thus prevent the line from twisting on its longitudinal axis.

In addition to preventing line twisting, the stabilizer blade 25 is caused to wobble or flutter about the vertical axis 27 by reason of the loose horizontal fit of the legs 31, 33 in the holes 26, 26, and such wobbling or fluttering will attract fish and induce them to strike the lure. The wobbling or fluttering action is induced, it is believed, by unequal water pressures setup as water passes and is permitted to escape on either side of the wobbling stabilizer plate.

It will be appreciated that other lures, including conventional spoons and spinners, may be attached to the wire connector 29 in place of the body 10. Also, the body 10 may be omitted and the hook 11 may be attached directly to the connector 29, or to such connector by means of a split ring (FIGURE 4) or a snap and swivel (FIGURE 5). Further, hooks containing either real or artificial bait may be used, and in such cases it is preferred to use the snap and swivel connection because the latter provides a sturdy elongation of the leader from the hook.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and had advantages not herein specifically described; hence it will be appreciated that the herein disclosed embodiment is illustrative only, and that my invention is not limited thereto.

I claim:
1. A fishing lure comprising
a body including an elongated substantially straight wire having loops at its opposite ends,
a plurality of beads on said wire,
a fish hook having a loop connected to one of said wire body loops,
a light-reflecting blade rotatably mounted on said wire for revolution about the longitudinal axis thereof,
a stabilizer blade having a pair of closely spaced holes,
and a wire connector having a loop at one end connected to the other of said wire body loops, and its other end terminating in a reversely bent free leg diverging from the adjacent wire connector portion thereby defining a substantially U-shaped bight,
said wire connector being secured to said stabilizer blade by having said free leg extending through one of said stabilizer blade holes and having said adjacent wire connector portion extending therearound from the other of said holes thereby to dispose said bight on one side of said stabilizer blade and forming therewith a loop to which a fishing line may be secured, and wherein the divergence between said free leg and said adjacent connector portion prevent inadvertent disassembly of said stabilizer blade from said wire connector.

2. In a spinner type fishing lure having an elongated weighted and non-buoyant body provided with fish hook means at one end thereof and having a light-reflecting blade mounted on said body for free rotation about the longitudinal axis thereof, the improvement for preventing axial rotation of said body by said light-reflecting blade due to frictional coupling therebetween comprising: an axially extending wire at the other end of said body including a forwardly extending portion terminating in a reversely bent portion defining therebetween a bight of diverging U-shape configuration, and a substantially planar stabilizer blade having a pair of closely spaced holes therein receiving respectively said forwardly extending wire portion and said reversely bent wire portion to support said stabilizer blade solely by said wire portions transversely of the body longitudinal axis, with said bight forwardly of said stabilizer blade defining therewith a loop to which a fishing line may be secured, said diverging wire portions preventing inadvertent disassembly of said stabilizer blade therefrom.

3. The improved spinner-type fishing lure of claim 2 wherein said stabilizer blade is of substantially oblong planar configuration and wherein said pair of holes are disposed along the major lengthwise axis of said stabilizer blade with one of said holes disposed on the minor transverse axis of said stabilizer blade.

4. The improved spinner-type fishing lure of claim 3 wherein said stabilizer blade holes are substantially larger than said wire portions, to permit limited wobbling movement of said stabilizer blade about said lengthwise major axis to thereby wobble said body and said fishhook means to enhance the illusion of said lure being a live bait.

5. The improved spinner-type fishing lure of claim 3 wherein said reversely bent wire portion is received within said one hole and said forwardly extending wire portion is received within the remaining hole.

References Cited by the Examiner

UNITED STATES PATENTS

| | | | |
|---|---|---|---|
| 1,155,883 | 10/15 | Burkman | 43—42.16 |
| 1,333,154 | 3/20 | Buddle | 43—42.47 X |
| 1,934,158 | 11/33 | Yarvice | 43—42.15 |
| 2,482,466 | 9/49 | Cooper | 43—42.23 |
| 2,703,945 | 3/55 | Johnson | 43—42.06 |
| 2,708,805 | 5/55 | Garvie | 43—42.19 X |
| 2,792,661 | 5/57 | Denby | 43—42.16 |

FOREIGN PATENTS

| | | |
|---|---|---|
| 467,809 | 9/50 | Canada. |
| 641,101 | 5/62 | Canada. |
| 1,101,158 | 4/55 | France. |
| 1,109,690 | 9/55 | France. |

SAMUEL KOREN, *Primary Examiner*.